Oct. 11, 1938.   C. W. CRUMRINE   2,132,680

FILM LOCKING MECHANISM

Filed Jan. 7, 1937

Chester W. Crumrine
INVENTOR.

BY
ATTORNEYS

Patented Oct. 11, 1938

2,132,680

UNITED STATES PATENT OFFICE 2,132,680

FILM LOCKING MECHANISM

Chester W. Crumrine, Rochester, N. Y., assignor to Eastman Kodak Company, Rochester, N. Y., a corporation of New Jersey Application January 7, 1937, Serial No. 119,484

8 Claims. (Cl. 242—71)

This invention relates to photography and more particularly to photographic cameras. One object of my invention is to provide a camera with an automatic film locking mechanism adapted to function as each exposure area of film is wound into place. Another object of my invention is to provide a film locking mechanism which will be certain to operate and which can be released with very little effort. Another object of my invention is to provide a simple film locking structure which requires a minimum number of movable parts. Still another object of my invention is to provide a locking mechanism in the shape of a starwheel, the points of which are so arranged that they provide a smooth sliding surface against which the film may bear, and arranged so that when a perforated area of the film comes into place, the point of the starwheel may readily and purely engage the aperture to permit a pawl to lock the film against movement. A still further object of my invention is to provide a starwheel in which one point partially fills the opening, so that when the pawl is manually released, and a film is wound, the starwheel may turn a portion of a revolution so that two points will again engage the film and hold the pawl from its operative position, and other objects will appear from the following specification, the novel features being particularly pointed out in the claims at the end thereof.

Coming now to the drawing wherein like reference characters denote like parts throughout:

In a great many cameras, and especially in small size cameras, it is desirable to provide an automatic film latching mechanism so that it will not be necessary to look through the usual red or green window for numbers printed on backing paper, in order to determine the amount of winding necessary for presenting a fresh exposure area. I have provided a simple type of latching mechanism which takes up very little room and which has been found to work satisfactorily.

Figure 1:
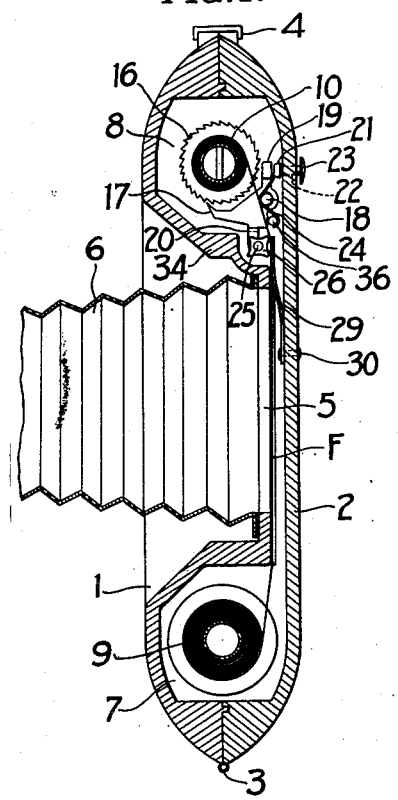
Figure 1 is a sectional view through a typical camera embodying a film locking mechanism constructed in accordance with and illustrating a preferred form of my invention.

In Fig. 1 I have shown a typical camera which may consist of a body portion 1 having a back 2 hinged at 3 and being provided with a suitable latching mechanism 4 at the opposite end. The camera body includes an exposure frame 5 through which light passes to the film, a bellows 6 being attached to the front side of the exposure frame.

Figure 4:
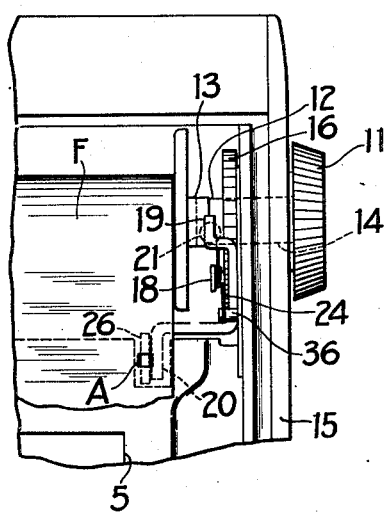
Fig. 4 is a fragmentary top plan view showing the film locking mechanism in a latching position.

On each end of the exposure frame 5 are spool chambers 7 and 8, the former being adapted to support a supply spool 9 and the latter being adapted to support a take-up spool 10. A manually operable film winding handle 11 may be provided, as shown in Fig. 4, this film winding member having a spool engaging web 12 for turning the spool through engagement with the well-known type of slot which is provided in this case in the spool trunnion 13.

The key web 12 is carried by a shaft 14 passing through the side wall 15 of the camera body and terminating in a winding handle which, in this case, is in the form of an annular knob 11. Also attached to the shaft 14 is a ratchet 16 which is in position to be engaged by a pawl 17 pivoted at 18 to the camera body and having a pair of arms 19 and 20.

Arm 19 lies under the end of a push-button 21, carried by a shaft 22 which terminates in a knob 23 on the outside of the camera. A spring 24 encircling the pivot 18 tends to move the pawl 17 in the direction opposite to that shown by the arrow, Fig. 2, away from engagement with the ratchet wheel 16.

The arm 20 carries a stud 25 on which is pivoted a starwheel 26 having a plurality of points 27. This starwheel is free to turn on the pivot 25 and when an unperforated area of film lies against the starwheel, two of the points 27 will engage and slide on the smooth surface of the film. Thus, in Fig. 2, the film can be wound freely sliding over the points of the starwheel.

Figure 2:
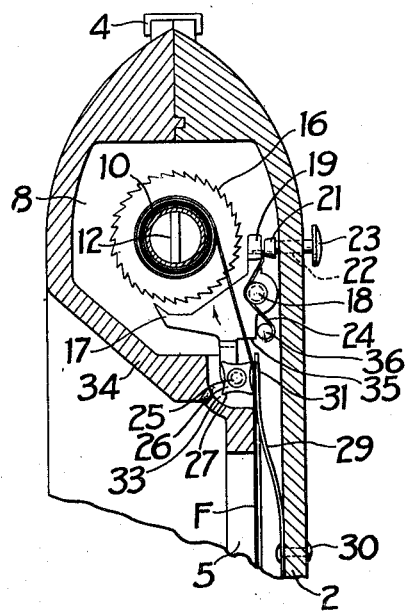
Fig. 2 is an enlarged fragmentary sectional view showing the film locking mechanism on an enlarged scale and in a position for winding film.

However, when an aperture A, as shown in Fig. 4, in the film F reaches the starwheel, a point 27 will immediately be thrust into the aperture, as shown in Fig. 4, so that the pawl 17 is turned about its pivot 18 in the direction shown by the arrow, Fig. 2, into engagement with the ratchet wheel 16, thus immediately stopping movement of the winding handle 11. This movement is caused by a point of the starwheel riding up on the abutment formed by the end 31 of spring 29 carried by the camera back 2 in a suitable manner as by rivets 30. Spring 29 is quite a heavy one and spring 24 being much weaker can not cause spring 29 to flex.

In order to turn a fresh area of film into place after an exposure has been made, the knob 23 is manually depressed and the handle 11 turned. As soon as the turning movement starts, the starwheel is rotated so that the point 27 previously in engagement with the aperture A, turns as the film moves, and this point, and the next point on the starwheel will then both ride against the film until the next aperture is reached. As soon as two points of the starwheel engage the surface of the film, the pawl 17 will be definitely held away from the ratchet so that the film can be wound without holding the button 23 depressed. The spring 24 will tend to hold the starwheel 26 toward the film F and the button 23 is thrust outwardly only when the starwheel rides up on the abutment 31 and cams the pawl 17 into the ratchet wheel 16, thus raising arm 19 so as to press upon button 21.

I have found a four pointed starwheel a most desirable form, altho other numbers of points may be used when suitable. It is necessary that the point should be able to cam the ratchet into locking position due to the height of the point above a line extending between two points.

It will be noted that the starwheel 26 is mounted in a rounded recess 33 in a camera wall 34, this recess being of such a shape and size that the starwheel is permitted to move with arm 20 a distance sufficient to permit the pawl 17 to engage the ratchet wheel 16. The limit of movement of the pawl 17 in an opposite direction is defined by the shoulder 35 on the pawl 17 striking the pin 36. Thus, in Fig. 2, when the parts are in their winding position, the shoulder 35 engages the pin 36 of the camera body and in this position, two points 27 of the starwheel will engage the smooth undersurface of the film.

Figure 3:
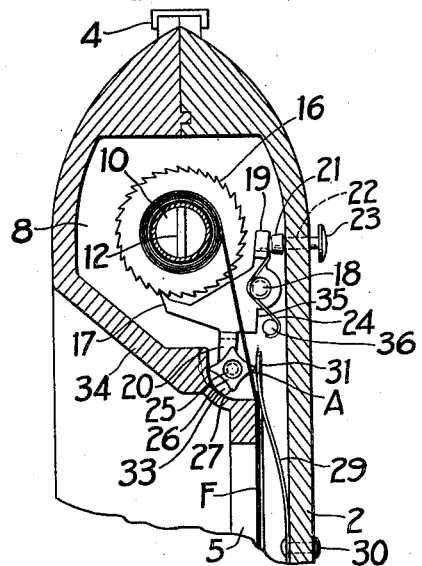
Fig. 3 is a view similar to Fig. 2 but with the parts shown in a film latching position.

As shown in Fig. 3, when one of the points of the starwheel 27 passes through a film aperture A, the pawl 17 is brought into engagement with the ratchet 16, thus preventing film from being wound.

While I have described a preferred embodiment of my invention, it is obvious that cameras of various different types can be equipped with my improved film locking mechanism by simply making this mechanism of a size and shape suitable for the particular camera to which it is to be attached.

What I claim is:

1. In a roll film camera, the combination with a camera body having spool chambers, an exposure frame between said spool chambers and a film spool winding handle for turning a spool of apertured film for winding film into position for exposure, of means for automatically stopping the winding movement of the handle comprising a ratchet wheel carried thereby and a pivoted pawl adjacent thereto adapted to engage said ratchet wheel, means for moving the pawl including a revolubly mounted starwheel having a plurality of points, any two of which are adapted to slidably engage a smooth film surface, one of said points being adapted to enter a film aperture, and an abutment carried by the camera against which a starwheel point may slide as it passes through a film aperture, whereby the pawl may be moved as the starwheel is turned by the film to bring the pawl into engagement with the ratchet.

2. In a roll film camera, the combination with a camera body having spool chambers, an exposure frame between said spool chambers, and a film spool winding handle for turning a spool of apertured film for winding film into position for exposure, of means for automatically stopping the winding movement of the handle comprising a ratchet wheel carried thereby and a pivoted pawl adjacent thereto adapted to engage said ratchet wheel, means for moving the pawl including a pointed starwheel revolubly mounted on the pawl, two of said points being adapted to engage and slide on the smooth surface of a film wound past the starwheel by the handle, one point being adapted to enter a film aperture, an abutment carried by the camera and located adjacent the starwheel, whereby said point entering the film aperture may cam the pawl into engagement with said ratchet as the starwheel is turned by said film.

3. In a roll film camera, the combination with a camera body having spool chambers, an exposure frame between said spool chambers, and a film spool winding handle for turning a spool of apertured film for winding film into position for exposure, of means for automatically stopping the winding movement of the handle comprising a ratchet wheel carried thereby and a pivoted pawl adjacent thereto adapted to engage said ratchet wheel, means for moving the pawl including a pointed starwheel revolubly mounted on the pawl, two of said points being adapted to engage and slide on the smooth surface of a film wound past the starwheel by the handle, one point being adapted to enter a film aperture and be turned thereby, an abutment carried by the camera, the starwheel point being adapted to engage said abutment to cam the pawl into locking engagement with the ratchet wheel.

4. In a roll film camera, the combination with a camera body having spool chambers, an exposure frame between said spool chambers, and a film spool winding handle for turning a spool of apertured film for winding film into position for exposure, of means for automatically stopping the winding movement of the handle comprising a ratchet wheel carried thereby and a pivoted pawl adjacent thereto adapted to engage said ratchet wheel, means for moving the pawl including a pointed starwheel revolubly mounted on the pawl, two of said points being adapted to engage and slide on the smooth surface of a film wound past the starwheel by the handle, one point being adapted to enter a film aperture and be turned thereby, an abutment carried by the camera for directing film through a relatively fixed path, a spring for holding the starwheel against said abutment, said starwheel point being adapted to engage said abutment through said aperture as it is turned thereby to cam said pawl into locking engagement with said ratchet.

5. In a roll film camera, the combination with a camera body having spool chambers, an exposure frame between said spool chambers, and a film spool winding handle for turning a spool of apertured film for winding film into position for exposure, of means for automatically stopping the winding movement of the handle comprising a ratchet wheel carried thereby and a pivoted pawl adjacent thereto adapted to engage said ratchet wheel, means for moving the pawl including a pointed star wheel revolubly mounted on the pawl, two of said points being adapted to engage and slide on the smooth surface of a film wound past the star wheel by the handle, one point being adapted to enter a film aperture and be turned thereby, an abutment carried by the camera for directing film through a relatively fixed path, a spring for holding the star wheel against said abutment, said star wheel point being adapted to engage said abutment through said aperture as it is turned thereby to cam said pawl into locking engagement with said ratchet, and connections between said pawl and a knob outside of the camera for disconnecting the pawl and ratchet whereby the film may be wound and two star wheel points may slide on the film.

6. In a roll film camera, the combination with a camera body having spool chambers, an exposure frame between said spool chambers, and a film spool winding handle for turning a spool of apertured film for winding film into position for exposure, of means for automatically stopping the winding movement of the handle comprising a ratchet wheel carried thereby and a pivoted pawl adjacent thereto adapted to engage said ratchet wheel, an arm on the pawl, a four pointed star wheel pivotally attached to said arm, a spring holding the star wheel against the film with two points in contact therewith, an abutment holding the film in a path, a film aperture being adapted to be engaged by one point of the star wheel as the film is turned whereby said star wheel point may engage said abutment and cam said pawl against the action of its spring into engagement with said ratchet.

7. In a roll film camera, the combination with a camera body having spool chambers, an exposure frame between said spool chambers, and a film spool winding handle for turning a spool of apertured film for winding film into position for exposure, of means for automatically stopping the winding movement of the handle comprising a ratchet wheel carried thereby and a pivoted pawl adjacent thereto adapted to engage said ratchet wheel, an arm on the pawl, a four pointed star wheel pivotally attached to said pawl, a spring holding the star wheel against the film with two points in contact therewith, a film guiding spring much heavier than the pawl spring against which a point of the star wheel may engage when a film aperture is wound past the star wheel whereby said star wheel point in turning may cam the pawl into engagement with the ratchet.

8. In a roll film camera, the combination with a camera body having spool chambers, an exposure frame between said spool chambers, and a film spool winding handle for turning a spool of apertured film for winding film into position for exposure, of means for automatically stopping the winding movement of the handle comprising a ratchet wheel carried thereby and a pivoted pawl adjacent thereto adapted to engage said ratchet wheel, an arm on the pawl, a four pointed star wheel pivotally attached to said pawl, a spring holding the star wheel against the film with two points in contact therewith, a film guiding spring much heavier than the pawl spring against which a point of the star wheel may engage when a film aperture is wound past the star wheel whereby said star wheel point in turning may cam the pawl into engagement with the ratchet, and manual means for releasing the pawl, whereby the handle may be turned to move the film and two points in the star wheel may slide on the film.

CHESTER W. CRUMRINE.